United States Patent [19]

Brent

[11] Patent Number: 4,936,197
[45] Date of Patent: Jun. 26, 1990

[54] DYNAMIC SEAL CONSTRUCTION

[75] Inventor: Robert G. Brent, Arlington, Tex.

[73] Assignee: C. E. Conover & Co., Inc., Fairfield, N.J.

[21] Appl. No.: 383,860

[22] Filed: Jul. 21, 1989

Related U.S. Application Data

[63] Continuation-in-part of Ser. No. 256,628, Oct. 12, 1988, abandoned.

[51] Int. Cl.$^5$ .............................................. F16J 15/18
[52] U.S. Cl. ...................................... 92/168; 92/165 R; 277/103; 277/110; 277/99; 277/102; 277/123; 277/125
[58] Field of Search ...................... 92/167, 166, 165 R, 92/193, 194, 168, 247, 250, 168; 277/75, 116, 203, 114, 102, 98, 99, 100, 110, 123, 125

[56] References Cited

U.S. PATENT DOCUMENTS

| 12,806 | 6/1908 | Schaefer | 277/99 |
|---|---|---|---|
| 407,533 | 7/1889 | Kellogg | 277/110 |
| 745,908 | 12/1903 | Ried | 277/99 |
| 911,228 | 2/1909 | Fulford | 277/99 |
| 943,835 | 9/1908 | Maltby | 277/99 |
| 1,798,158 | 3/1931 | Hazard | 277/110 |
| 1,799,335 | 4/1931 | Waddell | 277/110 |
| 1,945,151 | 1/1934 | Marsh | 92/247 |
| 2,023,898 | 12/1935 | Olson | 277/99 |
| 2,060,209 | 11/1936 | Heckert | 277/99 |
| 2,567,479 | 9/1947 | Hebard | 277/110 |
| 2,745,687 | 5/1956 | Stack | 277/110 |
| 2,847,236 | 8/1958 | Lazar | 277/98 |
| 2,957,712 | 10/1960 | Farmer | 277/103 |
| 3,129,948 | 4/1964 | Kendall | 277/103 |
| 3,264,005 | 8/1966 | Bialkowski | 277/110 |
| 3,608,912 | 9/1971 | Templin et al. | 277/102 |
| 3,841,809 | 10/1974 | Tucker | 277/110 |
| 3,966,235 | 6/1976 | Lewis | 277/102 |
| 3,968,970 | 7/1976 | Vogeli | 277/123 |
| 3,982,765 | 9/1976 | Fickelschr et al. | 277/106 |
| 4,170,363 | 10/1979 | Bergman | 277/116 |
| 4,251,081 | 2/1981 | Skoog | 92/168 |
| 4,809,993 | 3/1989 | Henshaw | 277/110 |

FOREIGN PATENT DOCUMENTS

| 67391 | of 1939 | Czechoslovakia | 277/102 |
|---|---|---|---|
| 3045477 | 7/1982 | Fed. Rep. of Germany | 92/168 |
| 34562 | 9/1929 | France | 277/110 |
| 1196448 | 1/1960 | France | 92/168 |
| 574091 | 3/1958 | Italy | 277/110 |
| 212136 | 5/1962 | Sweden | 277/102 |
| 195441 | 7/1964 | Sweden | 277/110 |
| 391404 | 9/1965 | Switzerland | 277/125 |
| 0666344 | 6/1979 | U.S.S.R. | 277/102 |
| 0781468 | 11/1980 | U.S.S.R. | 277/81 R |
| 814830 | 6/1957 | United Kingdom | 277/125 |
| 2112087 | 6/1983 | United Kingdom | 277/102 |

Primary Examiner—Robert E. Garrett
Assistant Examiner—Thomas Denion
Attorney, Agent, or Firm—Hopgood, Calimafde, Kalil, Blaustein & Judlowe

[57] ABSTRACT

In a preferred embodiment of hydraulic actuator wherein a piston rod is longitudinally positionable via a tail end of a cylinder, tail-end static and dynamic seal members are of plastic, of relatively elongate trapezoidal section, and a single metal spring axially preloads the two seal members in compression, via the series-related respective ends of the seal members. Engagement with the ends of each seal member are frusto-conical, to substantially match the sloped ends of the trapezoidal section, and the slope directions of these seal-member engagements are (in the case of the dynamic seal) such as to locally impart radially inwardly directed force, to drive outer ends of the seal into circumferentially uniform engagement with the piston rod of the actuator; in the case of the static seal the slope directions of seal-member engagements are such as to impart radially outwardly directed force, to drive outer ends of the static seal into similar engagement with the bore of the cylinder. Examined closely, two circumferentially continuous dynamic-seal actions are developed at the respective ends of each seal member. And the single spring assures maintenance of both of these seal actions for both static and dynamic seals, over the longer-wear life of the construction and over an unusually great range of temperature conditions.

18 Claims, 2 Drawing Sheets

DYNAMIC SEAL CONSTRUCTION

RELATED CASE

This application is a continuation-in-part of copending application Ser. No. 256,628, filed Oct. 12, 1988, now abandoned.

BACKGROUND OF THE INVENTION

The invention relates to translating-type fluid-power actuators wherein a dynamic seal or gland is needed to prevent or minimize pressure fluid leakage at the tail end of an actuator cylinder, namely, the end via which a driven piston rod must longitudinally displace, in the course of actuator operation.

Such actuators are commonly double-acting and are used for actuation of aerodynamic control elements of an aircraft, as for the variable setting of aeleron, rudder, elevator or the like control surfaces.

Dynamic seal action against the piston rod must provide utmost assurance against loss of pressure fluid, under a range of operating and environmental temperatures which can extend from −65° F. to as much as +400° F., with minimum friction and wear of a retained seal element at interface with the displacing piston rod. Elastomeric seal elements have been commonly employed, but under the more severe demands of modern aircraft elastomeric materials have exhibited significant undesired characteristics, notably losing shape and extruding into running clearances, and otherwise developing extremes of friction variation in performance of the involved actuator. Premature seal failure and unpredictable mechanical hysteresis in actuator performance are encountered, all too often.

More particularly, in conventional design, a dynamic seal of the character indicated consists of an elastomeric ring of varying cross-sectional shape, retained in a groove in the tail end of the cylinder, and sealing capability is a function of the modulus and compression of this ring. Thermal compensation for high temperatures is gained by providing a groove width greater than the compressed axial extent of the elastomeric seal member, but sufficient seal squeeze must be designed into the construction, in order to compensate for seal-member contraction at low temperatures. Thus, the seal member can slide or roll in the groove, resulting in seal failure.

To offset such failure, it has been attempted to use another ring, usually of a plastic material, in conjunction with the rubber ring, in which case the plastic ring is in contact with the piston rod, and the rubber ring is used as a static seal and provides a preloading resilient function, forcing the plastic ring against the piston rod. This eliminates the spiral, nibble and wear problems of elastomeric material in rubbing contact with the piston rod, but the thermal problems remain unsolved.

Other dynamic-seal designs seek to avoid use of elastomerics, by employing a spring ring inside a plastic shell, of "C"-shape cross-section. In such designs, the spring may be helical, canted-helical, or characterized by tangs or fingers. Sealing force around the perimeter of the seal cannot be consistent, so that wear is not uniformly distributed, being localized at the respective spaced points of spring, finger or tang contact with the plastic shell. Thermal compensation is gained in the same way as with an "O" ring, but problems remain, in respect of seal-slipping and tilting in the retaining groove.

BRIEF STATEMENT OF THE INVENTION

It is an object of the invention to provide an improved dynamic-seal construction of the character indicated, without employing rubber or other elastomeric material, either as the seal element, or to provide compliant energy for preloading the seal.

It is a specific object to provide such a seal construction, avoiding above-noted deficiencies of past constructions.

Another specific object is to meet the above objects with a construction which inherently provides circumferentially uniform distribution of preloading seal force against a piston rod and which additionally automatically adapts itself for effective sealing and low, uniform wear, over a relatively great range of operating temperature.

The invention achieves these objects and provides certain further features and advantages in an actuator construction wherein an annular tail-end seal member is of plastic, of relatively elongate trapezoidal section, and a single metal spring axially preloads two sleeves in compressional engagement with the respective ends of the seal member. The sleeve ends which engage the ends of the seal member are frusto-conical, to substantially match the sloped ends of the trapezoidal section, and the slope directions of these seal-member engagements are such as to locally impart radially inwardly directed force, tending to drive outer ends of the seal into circumferentially uniform engagement with the piston rod of the actuator. Examined closely, two circumferentially continuous dynamic-seal actions are developed at the respective axial ends of the seal member. And the helical spring assures maintenance of both of these seal actions, over the longer-wear life of the construction and over an unusually great range of temperature conditions.

DETAILED DESCRIPTION

The invention will be described in detail for several embodiments and in conjunction with the accompanying drawings, in which.

Figure 1:
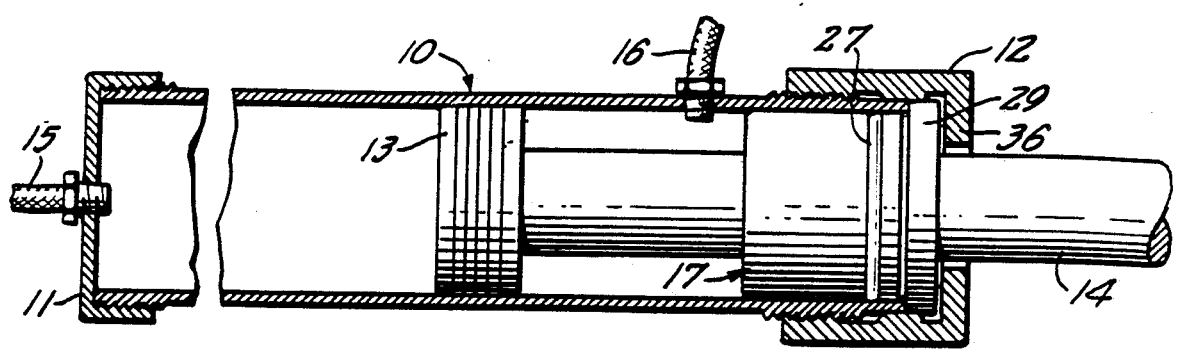
FIG. 1 is a simplified view in longitudinal section, to show a hydraulic actuator to which tail-end seal structure of the invention has been applied.

In FIG. 1, a hydraulic actuator is seen to comprise a cylinder 10, closed by a head cap 11 at one end and by a tail cap 12 at its other end. A piston 13 pilots on the bore of cylinder 10, and a piston rod 14 is connected at one end to piston 13, while its other end passes through a central opening in tail cap 12 for external delivery of piston-derived actuating force. Head and tail port connections 15, 16 enable the actuator to be double-acting, and tail-sealing means 17 of the invention is retained upon fitting the tail cap 12 to the cylinder.

Figure 2:
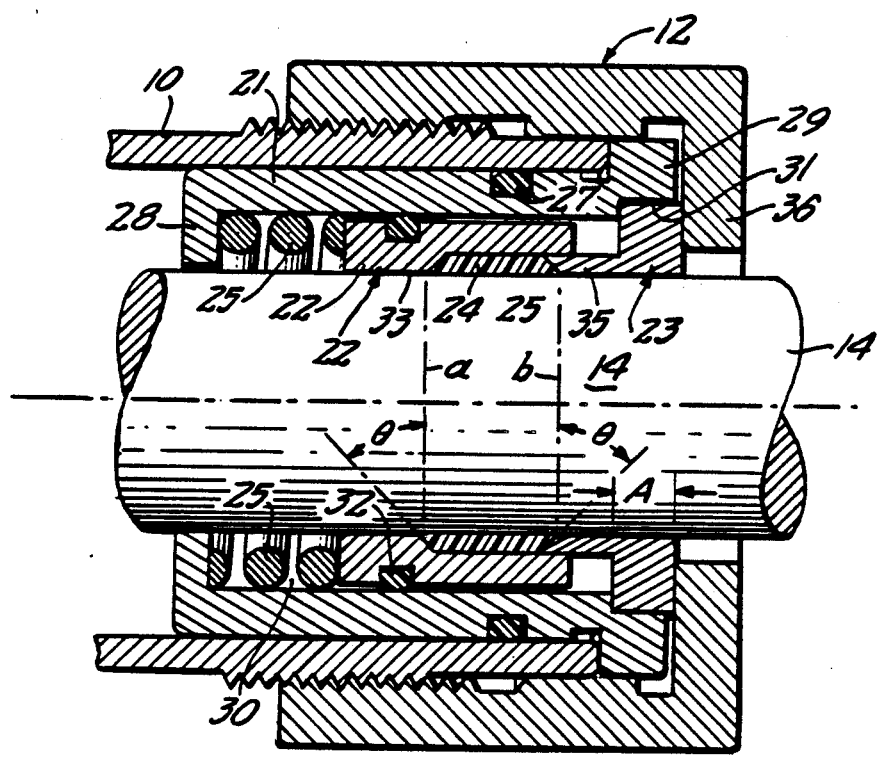
FIG. 2 is an enlarged similar section of tail-end structure.

In FIG. 2, the tail-sealing means 17 is seen to comprise a nested set of three sleeve members 21, 22, 23, which coact to compressionally preload the axial ends of an annular plastic seal member 24, under the steady applied axial force of spring means 25, shown as a helical coil having flat-ground ends, for uniform application of axial force. The outer sleeve member 21 has a relatively elongate cylindrical body fitted to the bore of cylinder 10, and an elastomeric O-ring 27 is captive in a circumferential groove for static-seal closure of any clearance in the fit to the bore of cylinder 10. At its axially inner end, a radially inward flange 28 extends to clearance relation with piston rod 14 and provides inner-end abutment reference for the inner end of spring 25; at its axially outer end, sleeve member 21 has a radially outward flange 29 which abuts the tail end of cylinder 10, to limit axial insertion of sleeve member 21. The bore 30 of outer sleeve member 21 is elongate and cylindrical, except for a short cylindrical counterbore 31 at its axially outer end.

The intermediate sleeve member 22 has running clearance with the bore 30 of outer sleeve member 21, and another elastomeric O-ring 32, captive in a circumferential groove in sleeve member 22, provides static-sealing closure of such clearance as exists in the fit of sleeve member 22 to bore 30. The bore 33 of intermediate sleeve member 22 is cylindrical and has running clearance with piston rod 14. An elongate cylindrical counterbore 34 contains the full axial extent of seal member 24, extending therebeyond to an extent sufficient for telescoping guidance of the axially short body portion 35 of inner sleeve member 23. Sleeve member 23 is also characterized by a radially outward flange, of axial extent A which exceeds the axial depth of counterbore 31, so that upon threaded advance of cap 12 onto the tail end of cylinder 10, the inward end-flange portion 36 of cap 12 not only drives the flange of inner sleeve 23 to the bottom of counterbore 31, but also thereby drives flange 29 of the outer sleeve member 21 into direct abutment with the adjacent axial end of cylinder 10. The net result is a secure clamping of both the inner sleeve member 23 and the outer sleeve member 21 to the tail end of cylinder 10, leaving intermediate sleeve member 22 to "float" in equilibrium between the compressional force of spring 25 and the axially squeezed reacting resistance of the plastic seal member 24.

It is a feature of the invention that the cross-section of seal member 24 is a relatively elongate trapezoid, with frusto-conical end faces which slope, preferably equally and oppositely at an angle $\theta$ to the axis of cylinder 10. Similarly, the axially inner end of counterbore 34 and the axially inner end of sleeve member 23 are also preferably equally and oppositely sloped, to substantially match the end slopes of seal member 24. Thus, pursuant to axial preload force provided by spring 25, the squeeze applied to the axial ends of seal member 24 is radially inwardly camming in nature, meaning that these ends of the seal member 25 are radially inwardly stressed, with circumferentially continuous distribution of spaced dynamic-seal locations that are suggested by phantom lines a–b in FIG. 2.

The described construction will be seen to substantially encapsulate the plastic seal member 24 between four surfaces which substantially conform to the respective four sides of the sectional trapezoid of seal member 24, namely the cylindrical counterbore 34 of intermediate sleeve member 22, the axially inner frusto-conical end of said counterbore, the frusto-conical axially inner end of inner sleeve member 23, and the cylindrical surface of piston rod 14. Dynamic sealing effectiveness is enhanced by the fact that two spaced circumferentially continuous seal regions (a–b) are established, and any wear effects are necessarily also uniformly circumferentially distributed. Temperature compensation follows from the ability of spring 25 to provide suitable axial preload force, however much intermediate sleeve member 22 has had to float in response to expansion/contraction of seal member 25 as a function of temperature change.

Figure 3:
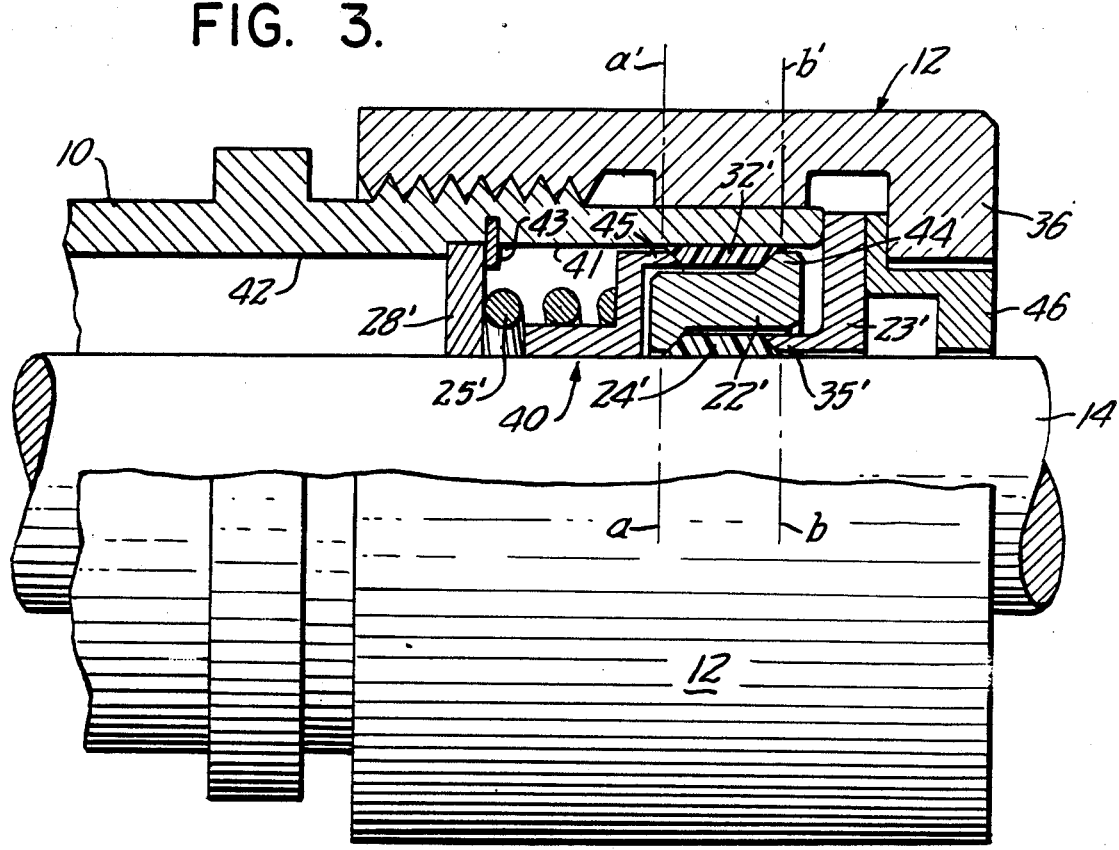
FIGS. 3 and 4 are views similar to FIG. 2, to show other embodiments, FIG. 3 being the presently preferred embodiment.
Figure 4:
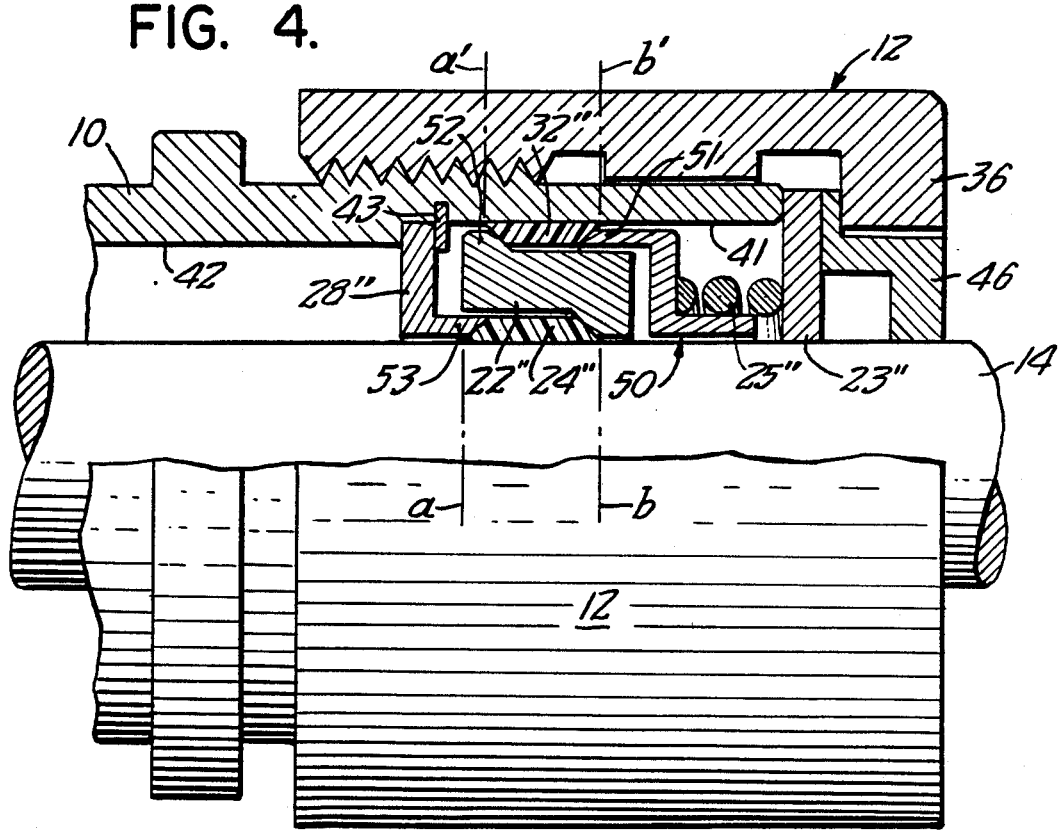

The embodiments of FIGS. 3 and 4 illustrate alternative arrangements in which the intermediate sleeve (22', 22") is formed, in conjunction with the cylinder bore and in conjunction with end-abutment formations, to define an annular encapsulating volume of trapezoidal section for outwardly camming coaction with the axial ends of an elongate annular static-seal member (32', 32") of similar section. In both cases, a single coil spring (25', 25") establishes the axial preload force on both the static-seal member (32', 32") and the dynamic-seal member (24', 24"). And where possible, the same reference numbers are used in FIGS. 3 and 4 for parts which correspond to those in FIG. 2.

The embodiment of FIG. 3 relies on three annular abutment members, the first two (23', 28') of which establish axially spaced fixed reference to the cylinder 10 when the flange 36 of end cap 12 has been secured to complete the sealed assembly; in this respect, these two members perform the abutment-member function of elements 23, 28 of FIG. 2 and have therefore been given the same reference numbers, but with primed notation. The third annular abutment member 40 is axially floating, in that it has running clearance with rod 14 and with a counterbore 41 in the cylinder bore 42, and in that it is the means of applying the preloading axial force of spring 25' to the static seal member 32', it being noted that abutment member 28' is seated at the axial inner end of counterbore 41 with retention by snap-ring means 43. The abutment member 23' is much the same as in FIG. 2, in that it includes an axially inward flange formation 35' with a frusto-conical end that conforms to the flare of the axially outer end of dynamic-seal member 24'. In departure from FIG. 2, the intermediate or floating sleeve member 22' of FIG. 3 has an elongate outer cylindrical surface at radial offset from the counterbore portion of the bore 42 of cylinder 10, and a radially outward flange formation 44 presents a frusto-conical shoulder face to the conforming slope of the adjacent axial end of the static-seal member 32'. Description is completed by identifying a short axially extending end formation 45 of abutment member 40, presenting a similar but oppositely sloped frusto-conical face for conformed abutment with the axially inner end of static-seal member 32'. Finally, a scraper element 46 has an outer flange which is clamped against abutment member 23' when cap 12 is secured; an inner flange of element 46 will be understood to have running clearance with piston rod 14 for clean maintenance of the piston-rod surface which must have dynamic-seal engagement with seal member 24'.

The embodiment of FIG. 4 will be recognized for similarity to FIG. 3, with the difference that the floating abutment member 50 is on the axially outer side of intermediate sleeve 22", and the preloading coil spring 25' reacts between abutment member 50 and the fixed outer-end abutment member 23". The radially outer flange formation 52 of sleeve 22" is at the axially inner end of sleeve 22" and provides a frusto-conical surface for conforming axial engagement with the flared axially inner end of static-seal member 32"; at its axially outer end, static-seal member 32" is oppositely flared for conforming axial engagement with a short axially extending inner-end formation of the floating abutment member 50. The annular dynamic-seal member 25" is again of trapezoidal section, being received via the axially inwardly open end of the counterbore of sleeve 22". At its inwardly flared axially inner end, seal member 24" has conforming axial engagement with a short axially extending formation 53 of the fixed abutment member 28".

The material of seal elements 24, 24', 24", 32', 32" may suitably be any one of a variety of available low-friction products, including DuPont's Teflon or Vespel, PEEK (polyetheretherketone), and polyetheherimide. The material of the floating intermediate sleeve 22, 22', 22" may be a suitable metal, such as stainless steel, aluminum, or brass.

The described construction is superior to prior conventional dynamic-seal constructions at least for the following reasons:

1. Neither rubber nor any other elastomeric is used as the dynamic-seal member.
2. Neither rubber nor any other elastomeric is used to provide spring energy for the seal.
3. The seal member is confined to an encapsulating space that is substantially equal to its size envelope; it therefore cannot slip or tilt.
4. The use of angular cam faces at points of preloaded squeeze action on the seal member produces two spaced circumferentially continuous lines of dynamic-seal action.
5. Thermal expansion/contraction is automatically accommodated by coil-spring action, and a greater range of temperature compensation is possible.
6. Any seal wear is not only uniformly distributed but is also compensated by the spring, i.e., no adjustment is needed to compensate for seal wear.
7. There is no loss of sealing preload force.
8. The sealing material may be selected for inert properties, i.e., resistance to or immunity from degrading attack by chemicals.

In the case of FIGS. 3 and 4, the same spring preloads both the static-seal relation and the dynamic seal relation, and spaced circumferentially continuous lines a–b of dynamic-seal engagement to rod 14 are matched by similarly spaced and substantially axially lapped circumferentially continuous lines a'–b' of static-seal engagement to the counterbore portion 41 of the cylinder bore 42.

As can be seen, each element of the described configurations, particularly in FIGS. 3 and 4, is extremely simple and readily able to be produced either by single-point machining techniques or by CNC or other automatic machining means. A diametral clearance is preferred on the non-sealing periphery of each seal element and between each of the other associated parts, thus allowing for a degree of lateral shift due to an eccentric or side load on the actuator.

What is claimed is:

1. A translating-type fluid-power actuator, comprising an elongate cylinder closed at its head end and having a piston rod connected to a piston having sealed sliding fit to the cylinder bore, and annular tail-closing structure including a tail cap threaded to the tail end of the cylinder and having an inward flange with a central opening via which the piston rod projects externally; said tail structure comprising:

an abutment member axially retained by said cylinder and providing a circumferentially continuous preload-abutment surface radially inward of the cylinder bore and axially inward of the tail end of said cylinder, an inner sleeve having running clearance with said piston rod and radially spaced from the bore of said cylinder and having a radially outward flange that is axially clamped by said tail cap with respect to the tail end of said cylinder, and an intermediate sleeve having static-sealed relation to the bore of said cylinder and having dynamic-sealed relation to said piston rod, said intermediate sleeve being characterized at its axially outer end by a radially outward flange in running clearance with the cylinder bore, and said intermediate sleeve having running clearance with said piston rod and a counterbore open to the axially outer end of said intermediate sleeve;

a solid deformable annular plastic static-seal member carried by said intermediate sleeve (a) in axially retained relation with the axially inner end of said flange and (b) in radially confined relation with the cylinder bore;

a solid deformable annular plastic dynamic-seal member radially captive between said piston rod and said counterbore and axially captive between said inner sleeve and the axially inner end of said counterbore; and axially preloading spring means operative in the axial space between said abutment surface and the axially inner end of said static-seal member, whereby said intermediate sleeve axially floats between and assures axial preloading of both the static-sealed relation and the dynamic-sealed relation.

2. The actuator of claim 1, in which the tail end of said cylinder has a cylindrical counterbore defining a shoulder at its axially inner end, and in which said spring-abutment member is an annulus seated in said counterbore and against said shoulder, the static-seal relation with the cylinder bore being with respect to the counterbore of said cylinder.

3. The actuator of claim 1, in which the axial ends of said dynamic-seal member and the inner and intermediate sleeve surfaces between which said dynamic-seal member is captive are frusto-conical and sloped for radially inward camming action on the axial ends of said dynamic-seal member, in response to the axial preloading force of said spring means, whereby independent axially spaced dynamic-seal engagements to the piston rod are established at the respective axial ends of said dynamic-seal member.

4. The actuator of claim 1, in which said axially preloading means comprises a further sleeve member having running clearance with the cylinder bore and with said piston rod, and said spring means is a preloaded coil spring axially interposed between said preload-abutment surface and said further sleeve member, said further sleeve member having an axially outer end that is axially engageable only with said static-seal member.

5. The actuator of claim 4, in which the axial ends of said static-seal member and the static-seal engagement surfaces of said intermediate sleeve member and of said further sleeve member are frusto-conical and sloped for radially outward camming action on the axial ends of said static-seal member, in response to the axial preloading force of said spring means, whereby independent axially spaced static-seal engagements to the cylinder bore are established at the respective axial ends of said static-seal member.

6. The actuator of claim 1, in which the static-seal relation and the dynamic-seal relation are in substantially overlapping axial regions.

7. A translating-type fluid-power actuator, comprising an elongate cylinder closed at its head end and having a piston rod connected to a piston having sealed sliding fit to the cylinder bore, and annular tail-closing structure including a tail cap threaded to the tail end of the cylinder and having an inward flange with a central opening via which the piston rod projects externally; said tail structure comprising:
  a first annular abutment member axially retained by said cylinder and providing a circumferentially continuous preload-abutment surface radially inward of the cylinder bore and axially inward of the tail end of said cylinder,
  a second annular abutment member having at least running clearance with said piston rod and having a radially outer portion that is axially clamped by said tail cap with respect to the tail end of said cylinder, and
  an intermediate sleeve having static-sealed relation to the bore of the cylinder and having dynamic-sealed relation to said piston rod;
  said intermediate sleeve having an axially elongate annular body with cylindrical inner and outer surfaces which are respectively at radial offset with the piston rod and with the cylinder bore, a radially outward flange portion at one axial end of said body and in running clearance with the cylindrical bore thereby defining a static-seal engagement shoulder adjacent the outer cylindrical body surface, a radially inward flange portion at the other axial end of said body and in running clearance with the piston rod thereby defining a dynamic-seal engagement shoulder adjacent the inner cylindrical body surface;
  a third annular abutment member having at least running clearance with the cylinder bore and with the piston rod and axially between said intermediate sleeve and one to the exclusion of the other of said first and second abutment members, and a compressionally preloaded spring axially reacting between said third abutment member and said one abutment member;
  a solid annular plastic static-seal member radially engaged to the cylinder bore and axially engaged at one end to the static-seal shoulder of said body, said static-seal member being also axially engaged at its other end solely to one of said third and said other abutment members; and
  a solid annular plastic dynamic-seal member radially engaged to said piston rod and axially engaged at one end to the dynamic-seal shoulder of said body, said dynamic-seal member being also axially engaged at its other end solely to said one abutment member, whereby said spring preloads the axial compression of both said static-seal relation and said dynamic-seal relation, with said intermediate sleeve in axially floating relation therebetween.

8. The actuator of claim 7, in which said static-seal member is an axially elongate annulus of trapezoidal section, the radially outer side of said section being longer than the radially inner side, thereby defining frusto-conical ends which are radially outwardly flared, the abutment-member surfaces engaged to said flared ends having correspondingly flared surfaces in circumferentially continuous engagement with said frusto-conical ends.

9. The actuator of claim 7, in which said dynamic-seal member is an axially elongate annulus of trapezoidal section, the radially inner side of said section being longer than the radially outer side, thereby defining frusto-conical ends which are radially inwardly flared, the abutment-member surfaces engaged to said flared ends having correspondingly flared surfaces in circumferentially continuous engagement with said frusto-conical ends.

10. The actuator of claim 7, in which each of said seal members is an elongate annulus of trapezoidal section, the radially outer side of the static-seal section being longer than the radially inner side thereof, the radially inner side of the dynamic-seal section being longer than the radially outer side thereof, thereby defining oppositely flaring frusto-conical ends of the respective seal members, and each of the abutment member surfaces which is engaged to a flared end of one of said seal members having a correspondingly flared surface in circumferentially continuous contact with the frusto-conical surface to which it is engaged.

11. The actuator of claim 7, in which said spring is between two of said abutment members on the axially inner side of said intermediate sleeve.

12. The actuator of claim 7, in which said spring is between two of said abutment members on the axially outer side of said intermediate sleeve.

13. As an article of manufacture, an annular seal assembly for captive mounting and cylinder-bore to piston-rod sealing action at the tail end of an actuator cylinder having a piston rod projecting externally through said tail end, wherein the tail-end of the cylinder has threaded engagement to the bore of a tail-end cap having a radially inward flange of inner diameter intermediate the cylinder-bore diameter and the piston-rod diameter, said seal assembly comprising:
  an outer sleeve having an elongate body sized for sliding engagement to the cylinder bore, a radially outward flange at one end of said outer-sleeve body for insertion-limiting abutment with the tail end of said cylinder, said outer-sleeve body having a cylindrical bore of diameter intermediate the cylinder-bore diameter and the piston-rod diameter, and a radially inward spring retaining flange in clearance relation with the piston rod at the other end of said outer-sleeve body, whereby a cylindrically annular volume is defined by and between the outer-sleeve body bore and the piston-rod diameter,
  an intermediate sleeve of lesser axial extend than the outer-sleeve body bore and with inner and outer cylindrical surfaces having running clearance with the pistod-rod diameter, said intermediate sleeve having a spring-abutment face at its axially inner end and a cylindrical counterbore communicating with its axially outer end, the axially inner end of the counter-bore of said intermediate sleeve being frusto-conical and outwardly flared in the axially outer direction, and
  an inner sleeve comprising a cylindrical body having running clearance with the counterbore of said intermediate sleeve and with the piston-rod diameter, and a radially outward flange at the axially outer end of said body and extending into at least partial radial overlap with said outer sleeve at the axially outer end of said outer sleeve, the axially inner end of said inner sleeve being a frusto-conical counterbore that is outwardly flared in the axially inward direction;

a solid annular stiffly deformable dynamic-seal member of low-friction thermoplastic material having frusto-conical axial ends that are flared and in surface-to-surface axial-abutting relation at one end with the inner end of the counterbore of the intermediate sleeve and at its other end with the inner end of the body of said inner sleeve;

spring means within the bore of said outer sleeve and adapted for compressional end abutment with the inward flange of said outer sleeve and with the spring-abutment face of said intermediate sleeve;

the axial extent of said dynamic-seal member being such that upon threaded advance of the cylinder cap onto the outer end of the cylinder, (a) the cap flange drives the radially outward flanges of the inner and outer sleeves into abutment with each other as limited by abutment with the axially outer end of said cylinder, and (b) the spring is axially compressed to axially displace said intermediate sleeve into axially compressive preloaded and radially inwardly cammed deformation of said dynamic-seal member into two axially spaced circumferentially continuous low-friction sealing engagements with the piston rod;

first static-seal means carried by the body of said outer sleeve for sealing engagement to the cylinder bore; and second static-seal means including an elastomeric ring for sealing the running clearance between said intermediate and outer sleeves.

14. The article of claim 13, in which said outer sleeve has a counterbore sized to receive and locate the flange of said inner sleeve, the flange of said inner sleeve being of greater axial extent than the depth of the outer-sleeve counterbore.

15. The article of claim 13, in which said spring is a coil spring in helically advancing circumferential envelopment of the piston rod.

16. A translating-type fluid-power actuator, comprising an elongate cylinder closed at its head end and having a piston rod connected to a piston having sealed sliding fit to the cylinder bore, and annular tail-closing structure including a tail cap threaded to the tail end of the cylinder and having an inward flange with a central opening via which the piston rod projects externally; said tail-closing structure comprising:

an outer sleeve axially fitting and statically sealed to the bore of said cylinder; p'an inner sleeve having running clearance with said piston rod and radially spaced from said outer sleeve, said inner and outer sleeves each having a radially outward flange, and said flanges being axially clamped by said tail cap to the tail end of said cylinder;

an intermediate sleeve in the space between said inner and outer sleeves and (a) having static-sealed clearance with the bore of said outer sleeve and (b) having at its axially inner end, running clearance with the piston rod, and (c) having a counterbore open to its axially outer end;

said outer sleeve having a radially inward flange at its axially inner end in axially spaced relation to the axially inner end of said intermediate sleeve;

axial-preloading spring means operative in the axial space between said outer sleeve and said intermediate sleeve;

and a solid annular plastic dynamic-seal member radially captive between said piston rod and the counterbore of said intermediate sleeve and axially captive between said inner sleeve and the axially inner end of the counterbore of said intermediate sleeve, the axial ends of said dynamic-seal member and the inner and intermediate sleeve surfaces between which said seal member is captive being frusto-conical and sloped for for radially inward camming action on the axial ends of said seal member, in response to the axial preloading force of said spring means, whereby independent axially spaced dynamic-seal engagements to said rod are established at the respective axial ends of said dynamic-seal member.

17. The actuator of claim 16, in which said spring means is a helical coil.

18. A translating-type fluid-power actuator, comprising an elongate cylinder closed at its head end and having a piston rod connected to a piston having sealed sliding fit to the cylinder bore, and annular tail-closing structure including a tail cap threaded to the tail end of the cylinder and having an inward flange with a central opening via which the piston rod projects externally; said tail structure comprising:

a spring-abutment member axially retained by said cylinder and providing a circumferentially continuous spring-abutment surface radially inward of the cylinder bore and axially inward of the tail end of said cylinder, an inner sleeve having running clearance with said piston rod and radially spaced from the bore of said cylinder and having a radially outward flange that is axially clamped by said tail cap with respect to the tail end of said cylinder, and an intermediate sleeve (a) having static-sealed relation to the bore of said cylinder and (b) having at its axially inner end, running clearance with the piston rod, and (c) having a counterbore open to its axially outer end;

axial-preloading spring means operative in the axial space between said spring-abutment surface and said intermediate sleeve; and a solid annular plastic dynamic-seal member radially captive between said piston rod and the counterbore of said intermediate sleeve and axially captive between said inner sleeve and the axially inner end of the counterbore of said intermediate sleeve, the axial ends of said dynamic-seal member and the inner and intermediate sleeve surfaces between which said seal member is captive being frusto-conical and sloped for radially inward camming action on the axial ends of said seal member, in response to the axial preloading force of said spring means, whereby independent axially spaced dynamic-seal engagements to said rod are established at the respective axial ends of said dynamic-seal member.

* * * * *